(12) United States Patent
Liu et al.

(10) Patent No.: US 7,595,957 B2
(45) Date of Patent: Sep. 29, 2009

(54) SERVO GAIN ADJUSTMENT BASED ON BIAS FORCE ERROR

(75) Inventors: KeXiu Liu, Jesmond (AU); JianGuo Zhou, Singapore (SG); MingZhong Ding, Singapore (SG); KianKeong Ooi, Singapore (SG); WenJun Cao, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 202 days.

(21) Appl. No.: 11/771,363

(22) Filed: Jun. 29, 2007

(65) Prior Publication Data

US 2009/0003146 A1    Jan. 1, 2009

(51) Int. Cl.
*G11B 5/596*    (2006.01)
(52) U.S. Cl. ................................. 360/78.09; 360/78.07
(58) Field of Classification Search ........................ None
See application file for complete search history.

(56) References Cited

U.S. PATENT DOCUMENTS

| | | | |
|---|---|---|---|
| 6,031,684 A | 2/2000 | Gregg | 360/78.06 |
| 6,453,331 B1 | 9/2002 | Burton et al. | 708/300 |
| 6,490,120 B1 | 12/2002 | Burton et al. | 360/78.07 |
| 6,545,838 B1 | 4/2003 | Burton | 370/78.06 |
| 6,570,733 B1 * | 5/2003 | Waugh et al. | 360/78.06 |
| 6,574,070 B2 * | 6/2003 | Gregg | 360/78.09 |
| 6,614,617 B1 | 9/2003 | Galloway | 360/78.06 |
| 6,937,430 B2 | 8/2005 | Ge et al. | 360/78.06 |
| 6,970,321 B2 | 11/2005 | Hsin et al. | 360/78.09 |
| 7,031,100 B2 | 4/2006 | Andress et al. | 360/78.09 |
| 7,116,515 B2 | 10/2006 | Chu et al. | 360/78.09 |
| 2003/0057900 A1 | 3/2003 | Min et al. | 318/114 |
| 2004/0047065 A1 * | 3/2004 | Miyata et al. | 360/77.02 |
| 2006/0007592 A1 * | 1/2006 | Takaishi et al. | 360/78.06 |

* cited by examiner

*Primary Examiner*—Jason C Olson
(74) *Attorney, Agent, or Firm*—David K. Lucente

(57) ABSTRACT

Apparatus and related methods are described for adjusting servo gain. In an exemplary apparatus, a circuit determines a bias force error that occurs between an estimated bias force and an actual bias force on an actuator during movement by a servo motor. The circuit adjusts a servo gain in response to the bias force error, and regulates movement of the actuator by the servo motor in response to the servo gain.

15 Claims, 6 Drawing Sheets

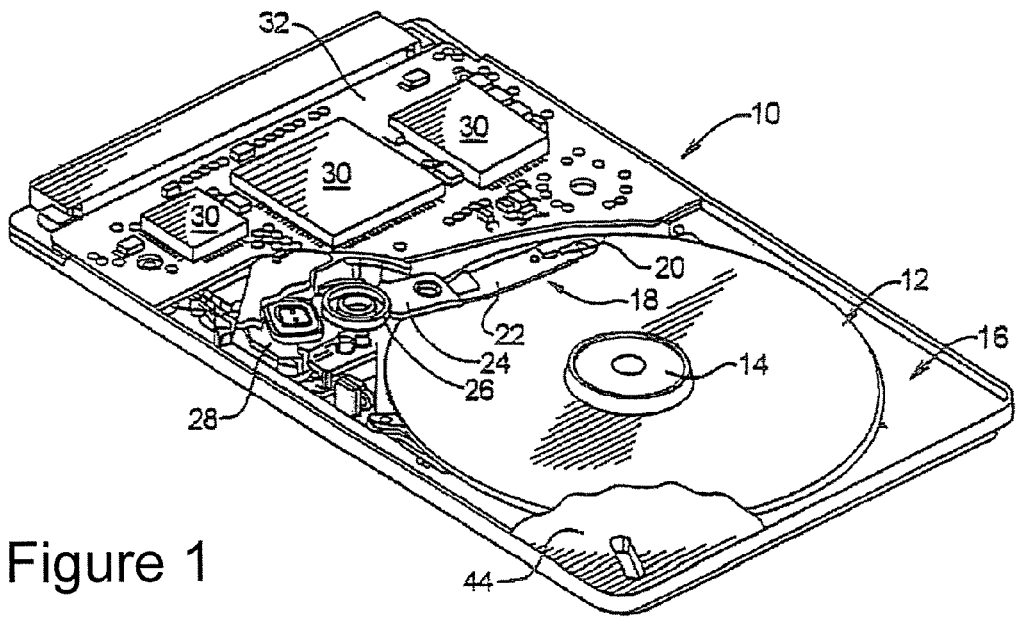
Figure 1
Figure 2
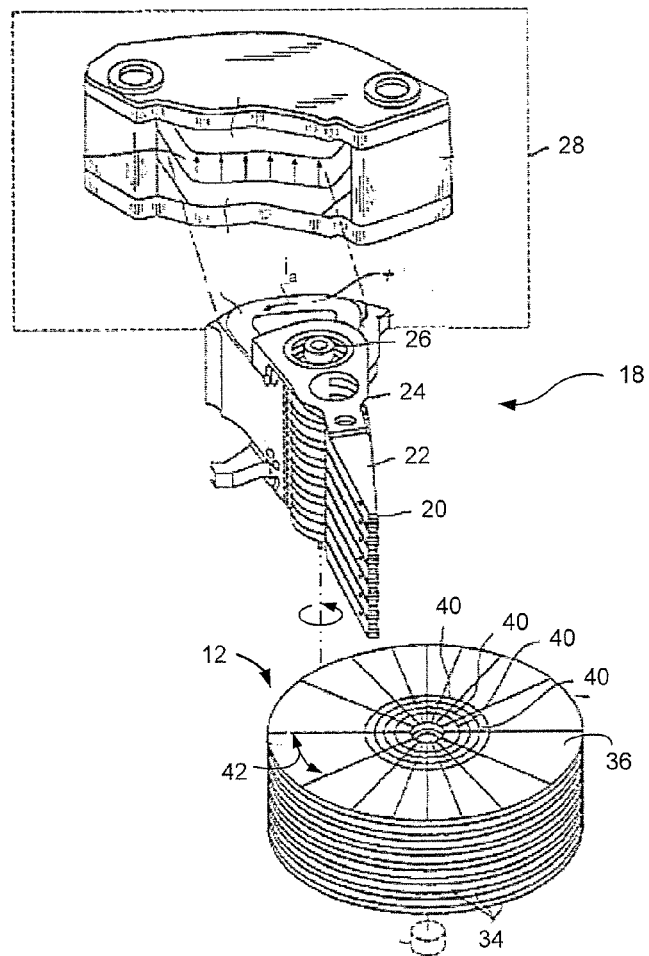

SERVO GAIN ADJUSTMENT BASED ON BIAS FORCE ERROR

FIELD

The present invention generally relates to controlling sensor movement and, more particularly, to controlling an actuator that moves a read/write head in a data storage device.

BACKGROUND

Disk drives are digital data storage devices which can enable users of computer systems to store and retrieve large amounts of data in a fast and efficient manner. A typical disk drive includes a plurality of magnetic recording disks which are mounted to a rotatable hub of a spindle motor and rotated at a high speed. An array of read/write heads is disposed adjacent surfaces of the disks to transfer data between the disks and a host computer. The heads can be radially positioned over the disks by a rotary actuator and a closed loop servo system and can fly proximate the surfaces of the disks upon air bearings.

A plurality of nominally concentric tracks can be defined on each disk surface. A preamp and driver circuit generates write currents that are used by the head to selectively magnetize areas of the tracks during a data write operation and amplifies read signals detected by the head during a data read operation. A read/write channel and interface circuit are connected to the preamp and driver circuit to transfer the data between the disks and the host computer.

The servo system can operate in two primary modes: seeking and track following. During a seek, a selected head is moved from an initial track to a target track on the corresponding disk surface. The servo system applies a current command signal to an actuator coil to accelerate the head toward the target track. During the seek, the servo system can measure the location of the head as it moves across the disk based on servo data that is recorded on the disk, and can adjust the current command signal in response to the location measurements. As the head approaches the target track, the servo system decelerates the head to bring it to rest over the target track. Thereafter, the servo system enters the track following mode wherein the head is maintained over the center of the target track while data is written/read.

As will be appreciated, a disk drive is primarily utilized to transfer data between the disk tracks and the host computer. Such data transfer operations usually cannot occur during a seek, but rather require the servo system to be in track following mode. Hence, to maximize disk drive data transfer rate capabilities disk drives can attempt to minimize their average seek times while satisfying other constraints on disk drive operation, such as noise and/or vibration constraints. However, a servo system that may be optimized based on the expected characteristics of a family of disk drives may not adequately compensate for differences in the characteristics between individual disk drives within that family. Moreover, over time disk drive characteristics can further vary due to, for example, mechanical wear, altitude variations, and power supply voltage variations. Accordingly, a servo system that is designed to provide minimum average seek times for a family of disk drives may not provide acceptable performance for at least some disk drives in the family.

SUMMARY

Embodiments of the present invention are directed to apparatus and methods that adjust servo gain. In some embodiments, a circuit determines a bias force error that occurs between an estimated bias force and an actual bias force on an actuator during movement by a servo motor. The circuit adjusts a servo gain in response to the bias force error, and regulates movement of the actuator by the servo motor in response to the servo gain.

In some further embodiments, the method includes determining a bias force error between an estimated bias force and an actual bias force on an actuator during movement by a servo motor, adjusting a servo gain in response to the bias force error, and regulating movement of the actuator by the servo motor in response to the servo gain.

In some further embodiments, an apparatus includes a servo controller that adjusts a servo gain based on differences between: 1) a position error, which is determined based on double integration of differences between a measured location and a desired location of an actuator during a seek operation; and 2) a bias force error, which is determined based on single integration of estimated responses and measured responses of a servo motor during the seek operation.

DESCRIPTION OF THE DRAWINGS

FIG. 1 is a perspective view of a disk drive with electronic circuits that are configured in accordance with at least some embodiments of the present invention.

FIG. 2 is a block diagram of an exemplary head disk assembly of the disk drive.

DETAILED DESCRIPTION

Figure 3:
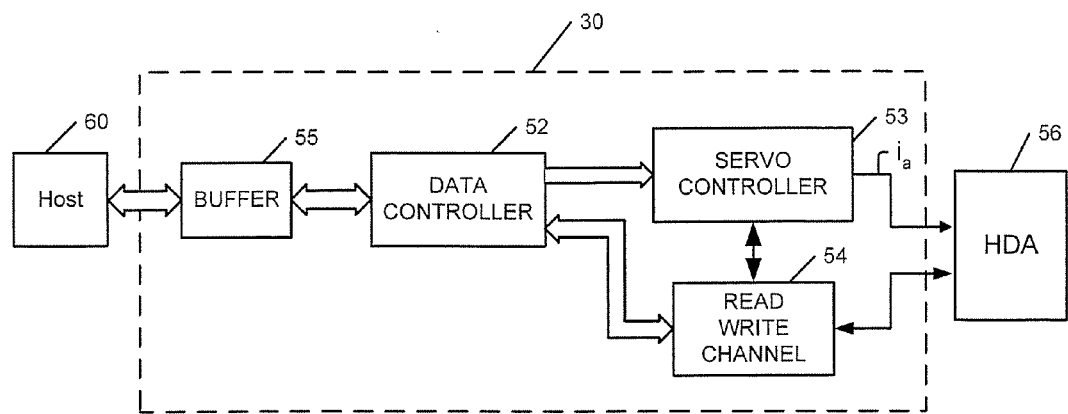
FIG. 3 is a block diagram of a portion of the controller and other electronic circuits of the disk drive shown in FIG. 1, and which are configured in accordance with some embodiments of the present invention.

Various embodiments of the present invention will now be described more fully hereinafter with reference to the accompanying drawings. However, this invention should not be construed as limited to the embodiments set forth herein.

Rather, these embodiments are provided so that this disclosure will be thorough and complete, and will convey the scope of the invention to those skilled in the art.

It will be understood that, as used herein, the term "comprising" or "comprises" is open-ended and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/" includes any and all combinations of one or more of the associated listed items. In the drawings, the size and relative sizes of regions may be exaggerated for clarity. Like numbers refer to like elements throughout.

Some embodiments may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium for use by or in connection with an instruction execution system.

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

A simplified diagrammatic representation of a disk drive, generally designated as 10, is illustrated in FIG. 1. The disk drive 10 includes a disk stack 12 (illustrated as a single disk in FIG. 1) that is rotated by a spindle motor 14. The spindle motor 14 is mounted to a base plate 16. An actuator 18 is also mounted to the base plate 16. The disk drive 10 is configured to store and retrieve data responsive to write and read commands from a host device. A host device can include, but is not limited to, a desktop computer, a laptop computer a personal digital assistant (PDA), a digital video recorder/player, a digital music recorder/player, and/or another electronic device that can be communicatively coupled to store and retrieve data in the disk drive 10.

The actuator 18 includes a head 20 (or transducer) mounted to a flexure arm 22 which is attached to an actuator arm 24 that can rotate about a pivot bearing assembly 26. The head 20 may, for example, include a magnetoresistive (MR) element and/or a thin film inductive (TFI) element. The actuator 18 also includes a servo motor 28 (e.g., voice coil motor (VCM)) which moves the head 20 relative to the disk stack 12. The spindle motor 14 and servo motor 28 are coupled to a controller, read/write channel circuits, and other associated electronic circuits 30 which can be enclosed within one or more integrated circuit packages mounted to a printed circuit board (PCB) 32. The controller, read/write channel circuits, and other associated electronic circuits 30 are referred to below as a "controller" for brevity. The controller 30 may include analog circuitry and/or digital circuitry, such as a gate array and/or microprocessor-based instruction processing device.

Referring now to the illustration of FIG. 2, the disk stack 12 typically includes a plurality of disks 34, each of which may have a pair of disk surfaces 36. The disks 34 are mounted on a cylindrical shaft and are rotated about an axis by the spindle motor 14.

The actuator 18 includes a plurality of the heads 20, each of which is positioned to be adjacent to a different one of the disk surfaces 36. Each head 20 is mounted to a corresponding one of the flexure arms 22. The servo motor 28 operates to move the actuator arm 24, and thus moves the heads 20 relative to their respective disk surfaces 36. The heads 20 are configured to fly on an air cushion relative to the data recording surfaces 36 of the rotating disks 34 while writing data to the data recording surface responsive to a write command from a host device or while reading data from the data recording surface to generate a read signal responsive to a read command from the host device.

FIG. 2 further illustrates tracks and spokes on the disks 34. Data is stored on the disks 34 within a number of concentric tracks 40 (or cylinders). Each track 40 is divided into a plurality of radially extending sectors 42. Each sector is further divided into a servo sector and a data sector. The servo sectors of the disks 34 are used to, among other things, accurately position the head 20 so that data can be properly written onto and read from a selected one of the disks 34. Exemplary servo data that may be stored in at least some of the servo sectors may include, for example, a DC erase field, a preamble field, a servo address mark (SAM) field, and a servo burst field of circumferentially staggered radially offset servo bursts (e.g., A, B, C, D servo bursts). The data sectors are where non-servo related data (i.e., host device data) is stored and retrieved.

FIG. 3 is a block diagram of host device 60 that is communicatively connected to a portion of the controller 30 of the disk drive 10 shown in FIG. 1 according to some embodiments. The controller 30 can include a data controller 52, a servo controller 53, a read write channel 54, and a buffer 55. Although two separate controllers 52,53, buffer 55, and a read write channel 54 have been shown for purposes of illustration and discussion, it is to be understood that their functionality described herein may be integrated within a common integrated circuit package or distributed among more than one integrated circuit package. Moreover, it is to be understood that the term "controller" may alternatively be referred to as "circuit." The head disk assembly (HDA) 56 can include a plurality of the disks 34, the actuator 18 with a plurality of heads 20 positioned adjacent to different data storage surfaces of the disks 34, the servo motor 28, and the spindle motor 14.

Write commands and associated data from the host device 60 are buffered in the buffer 55. The data controller 52 is configured to carry out buffered write commands by formatting the associated data into blocks with the appropriate header information, and to transfer the formatted data from the buffer 55, via the read/write channel 54, to logical block addresses (LBAs) on the disk 34 identified by the associated write command.

The read write channel 54 can convert data between the digital signals processed by the data controller 52 and the analog signals conducted through the heads 20 in the HDA 56. The read write channel 54 provides servo data read from the HDA 56 to the servo controller 53. The servo data can be used to detect the location of the head 20 in relation to LBAs on the disk 34. The servo controller 53 can use LBAs from the data controller 52 and the servo data to seek the head 20 to an addressed track and block on the disk 34, and to maintain the head 20 aligned with the track while data is written/read on the disk 34.

The servo controller 53 regulates the current command signal ($i_a$ of FIG. 3) supplied to the servo motor 28 to carry out a seek operation in which a selected head 20 is moved to a target track on the corresponding disk 34 and then settled into alignment with the target track so data can be written and/or read. Because a sampling rate of the servo sectors can be insufficient to adequately control positioning of the head 20, a multi-rate plant model is used to provide estimates of head position, velocity, and bias force so that corrections can be made in the positioning of the head 20 while, for example, the head 20 is over user sectors between adjacent pairs of successive servo sectors.

The servo controller 53 includes a seek control loop that has a servo gain Ka relating input command signals to output response of the servo motor 28 positioning the actuator assembly 18. As will be described below, the servo gain Ka can be applied to a seek command, to feedback signals from the plant, and to estimates from a plant model to generate a current command signal which is supplied to the servo motor 28.

The gain Ka may be varied as a function of the radial location of the head 20 relative to the disk 12, so as to, for example, compensate for variation in torque constant of the servo motor 28 across the disk 12. The servo motor 28 torque constant can vary due to variation in the motor's magnet flux as the actuator 18 is rotated from the outer diameter to the inner diameter of the disk 12. The servo motor 28 torque constant may vary according to a second order (parabolic) shape, with lower values near the inner diameter and outer diameter of the disk 12 and higher values near the middle diameter of the disk 12. The gain Ka may be selected among a table of Ka values that are associated with various radial zones across the disk 12.

The gain Ka may be adjusted in part based on calibration operations that attempt to reduce the result of a double integration of a position error signal (PES), which is formed as a difference between a desired head position and actual head position relative to the servo information on the disk 12. A gain Ka calibration operation is described in U.S. Pat. No. 6,490,120 which is incorporated herein by reference in its entirety. Gain Ka calibration may be carried out based on an assumption that the double integration of the PES represents a mismatch between an expected torque constant and an actual torque constant of the servo motor 28 at a defined current command signal.

However, in the disk drive 10, for any given track location of the head 20, there will be some amount of lateral force acting on the actuator assembly 18 tending to move the head 20 off-track, which is referred to as a "bias force." One potential source of the bias force can be wind which is created by the rotating disk 12. This windage bias force is usually directed radially outwardly from the rotating disk 12, with its strength increasing as the head 20 gets closer to the outer diameter parameter of the disk 12. Other potential sources of the bias force can include stresses created by the cable used to connect the head 20 through the rotatable actuator assembly 18 to the PCB 32, and/or viscous forces resisting rotation of the actuator assembly 18. Accordingly, a bias current level should be supplied to the servo motor 28 to oppose these lateral bias forces on the actuator assembly 18, and which can be sufficiently large so as to offset the lateral bias forces while seeking the head 20 or maintaining the head 20 aligned with a target track.

The inventors of the present application have determined that when one of the inputs to the control loop of the servo controller 53 is an estimate of bias force on the actuator assembly 18, error in the estimated bias force can introduce an unacceptable error when attempting to calibrate the gain Ka. Smaller form factor disk drives (e.g., 1" disk drives) can be more susceptible than larger form factor disk drives (e.g. 3.5" disk drives) to the effect of bias force error on error in the calibrated gain Ka. For example, the bias current level to compensate for bias force can be proportionally larger for smaller form factor disk drives than for larger form factor disk drives. Thus, 3.5" disk drives can have a substantially larger torque constant and corresponding larger ratio of the current command signal level to the bias current level relative to 1" disk drives. Thus, when controlling the servo motor 28 during a seek operation, an error in the estimation of bias current level can result in a larger error when calibrating the gain Ka of a 1" disk drive than when calibrating the gain Ka for a 3.5" disk drive.

In accordance with some embodiments, circuitry in the servo controller 53, and/or in another component of the electronics 30, is configured to determine a bias force error between an estimated bias force and an actual bias force on the actuator assembly 18 during movement thereof by the servo motor 28. The circuitry adjusts a servo gain in response to the determined bias force error, and regulates movement of the actuator 18 by the servo motor 28 in response to the servo gain. The circuitry may calibrate the gain Ka by seeking the head 20 to one or more target tracks while determining the bias force error, and adjusting the Ka to compensate for the determined bias force error(s) and to reduce PES observed while seeking. Calibration of the gain Ka may be carried out through a closed loop iterative process that repetitively seeks the head 20 to various target tracks and adjusts the gain Ka so as to compensate for the determined bias force error(s) and to reduce PES while seeking.

Figure 4:
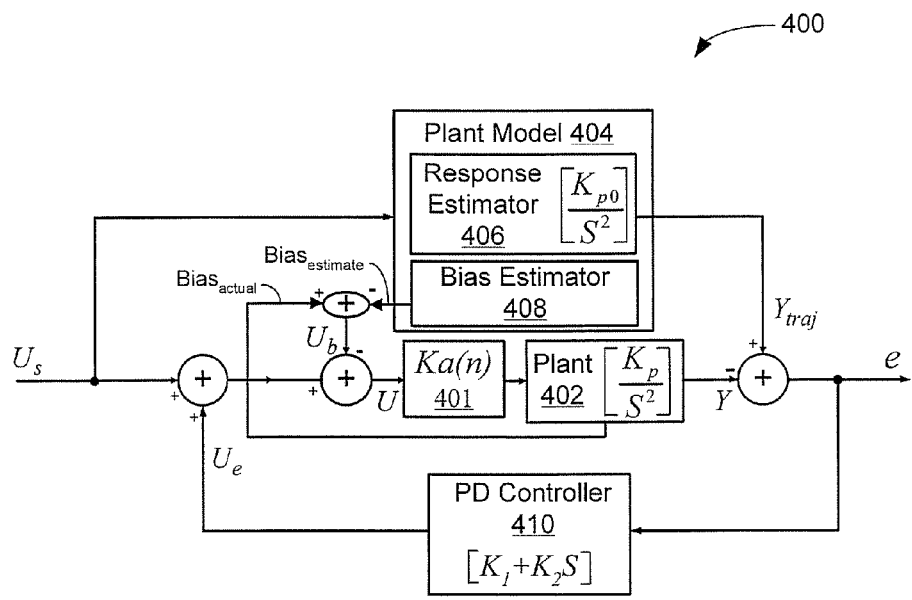
FIG. 4 is a block diagram of modeled reference sine seek controller that may be embodied in the servo controller in accordance with some embodiments.

FIG. 4 is a block diagram of a modeled reference sine seek controller 400 that may be embodied in the servo controller 53 of FIG. 3, and/or in another component of the electronics 30, in accordance with some embodiments. Referring to FIG. 4, a portion of the disk drive 10 referred to as the "plant" is denoted by block 402 and generally relates the actual response "Y" of the servo motor 28 to a servo command signal "$U_s$", where the plant response corresponds to radial positioning of the actuator assembly 18 and head 20 relative to the disk 12. The actual gain of the plant is represented in FIG. 4 as "$K_p$". Accordingly, the response Y of the plant can be determined as the double integration of the actual plant gain, as represented by the equation $Y=K_p/S^2$. The plant 402 also has an actual bias force that is exerted on the actuator assembly 18 during, for example seek operations when moving the head 20 to target tracks.

The servo controller 53 may generate the servo command signal $U_s$ as a sinusoidal servo command signal which may be based on a one minus cosine (1−cos) reference current signal. The servo controller may scale the sinusoidal servo command signal in response to each particular seek length (i.e., the number of tracks over which the head 20 will be moved via a seek operation). The sinusoidal servo command signal may be used for relatively short seek distances (e.g., such as less than about 100 tracks). Relatively longer seek operations may be carried out using velocity-controlled seeks, where the threshold seek distance may be determined based on, for example, a determination of which one of the sinusoidal servo command signal based seek or the velocity-control seek will provide faster seek performance.

The controller 400 includes a plant model 404 that is configured to model the nominal input to output response characteristics of the plant 402. A response estimator 406 in the plant model 400 generates an estimate of the response ("$Y_{traj}$") of the servo motor 28 to the input servo command signal "$U_s$". A bias estimator 408 in the plant model 400 generates an estimate of the bias force acting on the actuator assembly 18 ("bias estimate") during seek operations. The bias estimator 408 may estimate the bias force that is expected to occur on the actuator assembly 18 and head 20 as a function of, for example, radial location of the head 20 on the disk 12. The bias estimator 408 may include a table of estimated bias values mapped to radial partitions on the disk 12, and may select among the estimated bias values in the table based on a present radial location of the head 20 and/or a radial location of the target track on the disk 12.

The expected/estimated nominal gain of the servo motor 28 is represented in FIG. 4 as ("$K_{p0}$"). The response estimator 406 may represent the estimated response $Y_{traj}$ as a double integration of the expected nominal gain $K_{p0}$, as represented by the equation $Y_{traj}=K_{p0}/S^2$.

The error ("e") in FIG. 4 represents the difference between the estimated response $Y_{traj}$ from the response estimator 406 and the actual plant response Y. The error e is fed-back to a proportional derivative (PD) controller 410 that generates a feedback control signal ("$U_e$") therefrom. The PD controller 410 may generate the feedback control signal $U_e$ based on multiplication of the error e by a first defined gain $K_1$ added to the result of a second defined gain K2 that is multiplied by a first derivative of the error (e), as represented by the equation $U_e=(K_1+K_2S)e$.

The feedback control signal $U_e$ is summed with the sinusoidal servo command signal $U_s$, and a bias estimation error ("$U_b$") is subtracted from the result to generate a current command signal ("U"). During seeking and track following, the current command signal U is scaled (Block 401) by a calibrated gain Ka value to generate a scaled current command signal that is input to the plant 402 (e.g., supplied to the servo motor 28). The gain Ka value can be read from a table of predefined Ka values. The bias estimation error $U_b$ is determined as the difference between the estimated bias force ("$Bias_{estimate}$") from the bias estimator 408 and the actual bias force ("$Bias_{actual}$") exhibited by the plant 402, as represented by the equation $U_b=Bias_{actual}-Bias_{estimate}$.

The combined gain ("Ka") of the reference sine seek controller 400 can be determined as a ratio between $K_{p0}$ and $K_p$, as represented by the equation $Ka=K_{p0}/K_p$. As shown in FIG. 4, the error e between the nominal plant model output $Y_{traj}$ and the actual plant output Y is caused, at least in part, by both the bias estimation error $U_b$ and the error between the expected and actual gain Ka of the reference sine seek controller 400. Consequently, the feedback control signal $U_e$ may consist of two components $U'_e$ and $\tilde{U}_b$, as represented by Equation 1 below:

$$U_e=U'_e+\tilde{U}_b, \qquad \text{(Equation 1)}$$

where $\tilde{U}_b$ is the error in the bias estimation error $U_b$, and corresponds to a component contribution amount that would cancel the bias estimation error $U_b$.

Accordingly, the current signal U applied to the plant 402 can be represented by Equation 2 below:

$$U=U_s+U'_e+\tilde{U}_b-U_b\approx U_s+U'_e. \qquad \text{(Equation 2)}$$

The total seek time is represented as $t_{sk}$, and the calculated feed forward seek time is represented as $t_f$. For purposes of exemplary explanation only, the seek time $t_{sk}$ can be defined to be the duration from starting a seek to transitioning into a settling phase, and does not include the settling time $t_{st}$ to settle the head 20 into alignment with a target track. The velocity at time instant t ("v(t)") can be defined based on equation 3 below:

$$v(t)=\int_0^t U dt \approx \int_0^t (U_s+U'_e)dt. \qquad \text{(Equation 3)}$$

At the end of each seek, $t=t_{sk}$ and $v(t_{sk})\approx 0$, equation 3 can be simplified as shown in equation 4 below:

$$\int_0^{t_{sk}} (U_s+U'_e)dt \approx 0. \qquad \text{(Equation 4)}$$

For $t_f \leq t \leq t_{sk}$ and $U_s=0$, equation 4 can be further simplified as $$\int_{t_f}^{t_{sk}} U_s dt = 0,$$

which can be further represented as $$\int_0^{t_f} U_s dt = 0$$

in view of the sinusoidal feed-forward current $U_s$.

These relationships can be combined into equation 5 below:

$$\int_0^{t_{sk}} U_s dt = \int_0^{t_f} U_s dt + \int_{t_f}^{t_{sk}} U_s dt = 0. \qquad \text{(Equation 5)}$$

With continued reference to FIG. 4, the position error e, caused by the bias estimation error $U_b$ and plant gain mismatch $\Delta K_p=K_{p0}-K_p$, is compensated by the output $U_e$ of the PD controller 410. When $U'_e=U_e-\tilde{U}_b$, equations 4 and 5 can be used to define the equation $$\int_0^{t_{sk}} U'_e dt = 0.$$

Therefore, in view of equation 1 above, $$\int_0^{t_{sk}} U_e dt = \int_0^{t_{sk}} U'_e dt + \int_0^{t_{sk}} \tilde{U}_b dt = \int_0^{t_{sk}} \tilde{U}_b dt.$$

When the seek length is very small, $\tilde{U}_b$ can be considered to be constant during a seek operation, which provides the equation $$\int_0^{t_{sk}} U_e dt = \tilde{U}_b \int_0^{t_{sk}} dt = \tilde{U}_b t_{sk}.$$

Consequently, the error $\tilde{U}_b$ can be represented by equation 6 below:

$$\tilde{U}_b = \frac{\int_0^{t_{sk}} U_e dt}{t_{sk}} \qquad \text{(Equation 6)}$$

Figure 5:
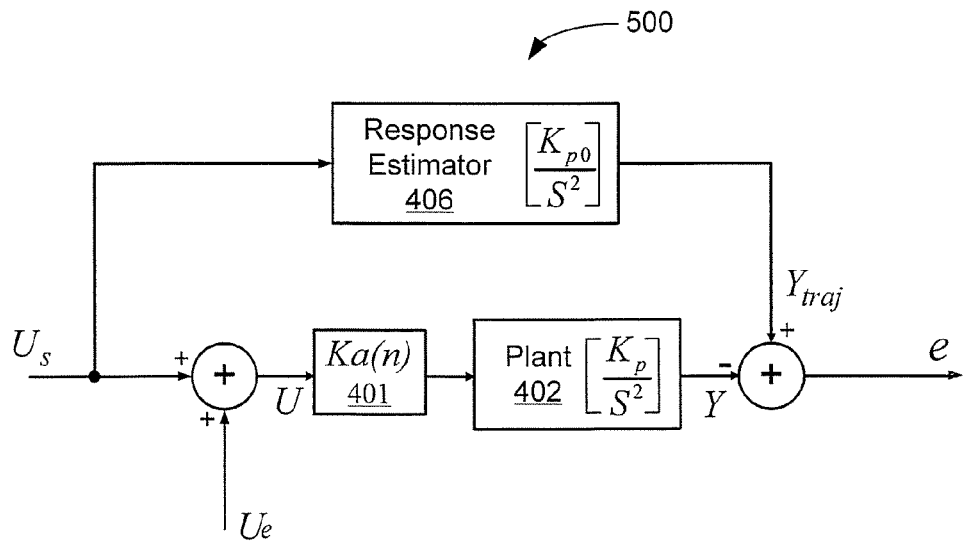
FIG. 5 is a block diagram of an equivalent sine seek controller that may be embodied in the servo controller in accordance with some embodiments.

In view of equation 6, the reference sine seek controller 400 of FIG. 4 can be modeled more simply as the equivalent sine seek controller 500 shown in FIG. 5. The equivalent sine seek controller 500 includes the response estimator 406 and plant 402 from FIG. 4.

Referring to FIG. 5, when the seek length is X and the seek time is $t_{sk}$, the seek length can then be represented by the following equation 7:

$$K_p \int_0^{t_{sk}} \int_0^{t_{sk}} (U'_e(t) + U_s(t)) dt = X \quad \text{(Equation 7)}$$

When seek operations are carried out using a sinusoidal feed-forward servo command signal $U_s$, the seek length X can be further represented by the following equation 8:

$$K_{p0} \int_0^{t_{sk}} \int_0^{t_{sk}} U_s(t) dt = X \quad \text{(Equation 8)}$$

Equations 7 and 8 can be combined to provide the following equation 9 representing the seek length X:

$$K_p \int_0^{t_{sk}} \int_0^{t_{sk}} U'_e(t) dt + \frac{K_p}{K_{p0}} X = X \quad \text{(Equation 9)}$$

The following relationships may thereby be provided:

$$\begin{cases} K_a = \dfrac{K_{p0}}{K_p} = W * C + 1 \\ C = \dfrac{K_{p0}}{X}, \\ W = \int_0^{t_{sk}} \int_0^{t_{sk}} U'_e(t) dt \end{cases} \quad \text{(Equation 10)}$$

where C is constant when the seek length X is fixed.

The double integration of $$W = \int_0^{t_{sk}} \int_0^{t_{sk}} U'_e(t) dt$$

can be calculated after each sinusoidal seek based on Equation 11 below:

$$W = \int_0^{t_{sk}} \int_0^{t_{sk}} U'_e(t) dt = \quad \text{(Equation 11)}$$

$$\int_0^{t_{sk}} \int_0^{t_{sk}} U_e(t) dt - \int_0^{t_{sk}} \int_0^{t_{sk}} \tilde{U}_b dt =$$

$$\int_0^{t_{sk}} \int_0^{t_{sk}} U_e(t) dt - \frac{t_{sk}^2}{2} \tilde{U}_b$$

Figure 6:
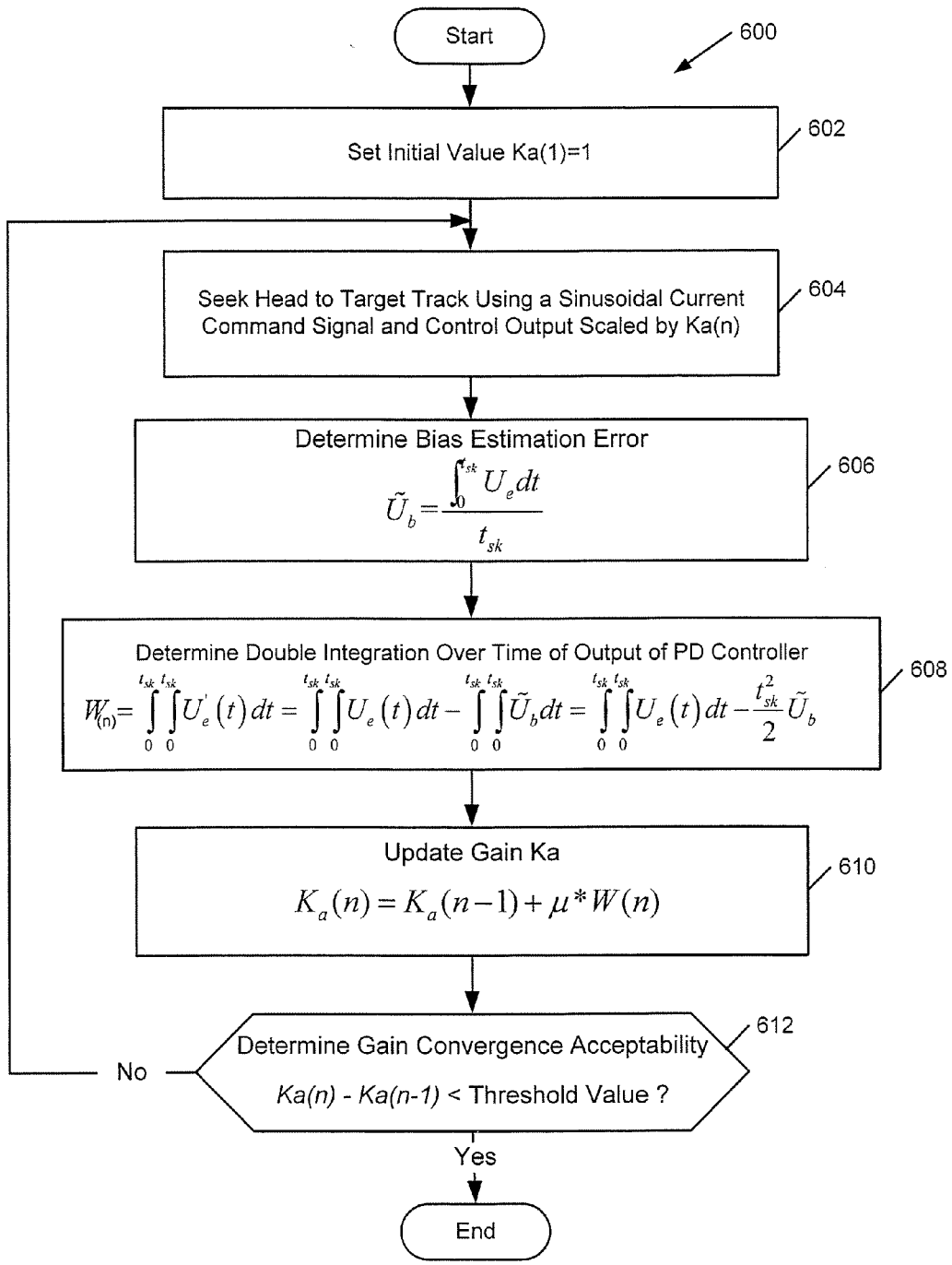
FIG. 6 is a flowchart of operations that may be carried out by the servo controller to calibrate a servo gain Ka for a radial location and/or radial zone on a disk in accordance with some embodiments.

FIG. 6 is a flowchart of operations 600 that may be carried out by the servo controller 53 to calibrate a servo gain (Ka) for a radial location and/or radial zone on a disk in accordance with some embodiments.

Referring to FIG. 6, the servo controller 56 may iteratively calibrate the servo gain Ka in an attempt to satisfy the following equation:

$$Ka(n) = Ka(n-1) + \mu * W(n). \quad \text{(Equation 12)}$$

At Block 602, the initial Ka value can be set to 1. At the beginning of each iteration, a new Ka(n) value can be used to compute the control output U.

The calibration operations 600 may be carried out, for example, during idle periods of time for the disk drive 10, so that the gain Ka can be adjusted while the disk drive 10 is not being utilized by the host 60 to store/retrieve data. Alternatively or additionally, the calibration operations 600 may be carried out while the host 60 is storing/retrieving data to enable dynamic adjustment of the gain Ka.

For each iteration of the gain calibration, the head 20 is moved through a seek operation at Block 604 from a present location to a target track using a command signal that is scaled by the gain Ka(n) for a present iteration. The seek operation may correspond to short seek distances in which the command signal is a sinusoidal servo command signal $U_s$ supplied to the modeled reference sine seek controller 400. A bias estimation error $\tilde{U}_b$ can be determined at Block 606 from equation 6, by accumulating the output of the PD controller 410 over the seek time $t_{sk}$ from starting the seek to transitioning into the settling phase.

At Block 608, a gain adjustment value W can be determined from equation 11 above, such as based on a difference between the accumulated position error and the accumulated bias force error for a present seek operation. At Block 610, the gain adjustment value W can be scaled by a convergence constant μ to generate a scaled gain adjustment value (μ*W(n)). The convergence constant μ can be defined to regulate how quickly the gain Ka follows changes in the gain adjustment value W, and, thereby, to provide stability in the gain Ka. The convergence constant μ can be much less than 1. A new gain Ka(n) of a present iteration number "n" can be determined by adding the gain adjustment value (μ*W(n)) to a previous gain Ka(n−1) from a previous seek iteration number "n−1".

At Block 612, a decision is made as to whether the iterative calibration should be continued or terminated. More particularly, a determination is made as to whether a difference between the new gain Ka(n) and the previous gain Ka(n−1) differs by at least a threshold gain convergence value and, if not, another iteration of gain calibration is carried out through Blocks 604-612. Otherwise, if the gain Ka has sufficiently converged at Block 612, the iterative gain Ka calibration process is terminated, and the newly calibrated gain Ka is subsequently used to regulate movement of the actuator assembly 18 by the servo motor 28 during seek operations.

The iterative gain Ka calibration operations 600 of FIG. 6 may be carried out for a plurality of radial zones across the disk 12. For example, the servo controller 53 may maintain a table of gain Ka values each corresponding to defined radial zones across the disk 12. For each defined radial zone, the table may further include a different gain Ka for seek operations that occur in a first direction across the disk 12 (e.g., toward the outer diameter) and for seek operations that occur in a second direction across the disk 12 (e.g., toward the inner diameter) that is opposite to the first direction. The servo controller 53 may select among the gain Ka values in the table in response to a radial location of the head 20 and/or a radial location of a target track of a seek operation and/or in response to a direction of the seek. The servo controller 53 can use the selected gain Ka to regulate movement of the actuator assembly 18 by the servo motor 28. The servo controller 53 may also adjust the selected value based on measurements carried out during the seek, such as described above. Moreover, the servo controller 53 may iteratively calibrate the gain Ka values in the table by carrying out iterative seek operations within each radial zone defined on the disk and, where utilized, for the opposite seek directions for which gain Ka values are defined.

Although calibration operations of FIG. 6 have been described in the context of what may be a calibration mode that is selectively turned on/off, it is to be understood that the gain Ka may additionally or alternatively be calibrated during each seek operation or during selected seek operations (e.g., during short seeks where a sinusoidal current command signal is utilized). Accordingly, the operations of Blocks 604-610 may be carried out during individual seek operations and/or may be carried out over a group of seek operations to calibrate the gain Ka.

Figure 7:
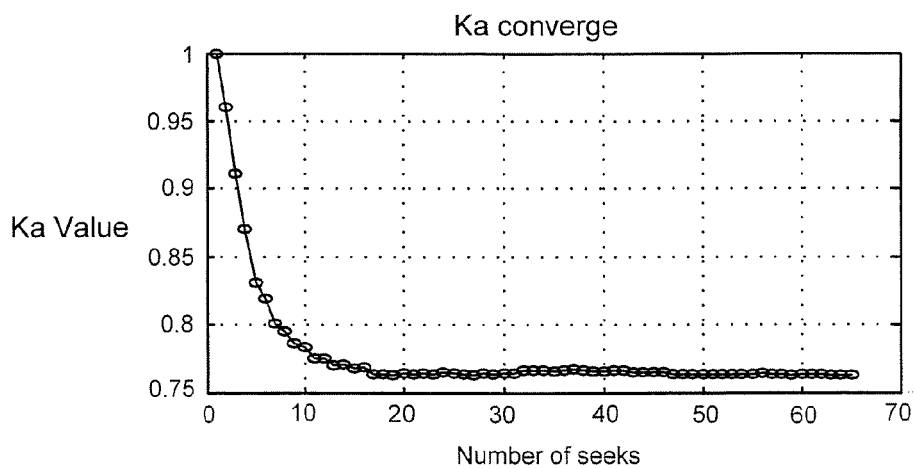
FIG. 7 illustrates a graph of the variation in servo gain Ka which is calibrated across a range of disk track cylinders at room temperature as may be exhibited by some embodiments.

FIG. 7 illustrates a graph of exemplary variations in servo gain (Ka) that may be obtained through calibration operations that are carried out across a range of disk track cylinders at room temperature as may be exhibited by some embodiments. Referring to FIG. 7, it is observed that during calibration of the gain Ka using a sinusoidal feed-forward servo command signal, the controller gain Ka substantially converges to a value within 20 to 30 seek operations for a selected radial zone on the disk 12. Accordingly, some embodiments may enable faster and more accurate calibration of the gain Ka using the determined bias force error, relative to what may be obtained using a conventional proximate time-optimal servo (PTOS) based calibration process which calibrates the gain Ka only in response to reducing PES. A conventional PTOS based calibration process may, in some instances, need more than 80 seek operations to converge the servo gain Ka to a stable value for a selected radial zone on the disk 12.

Figure 8:
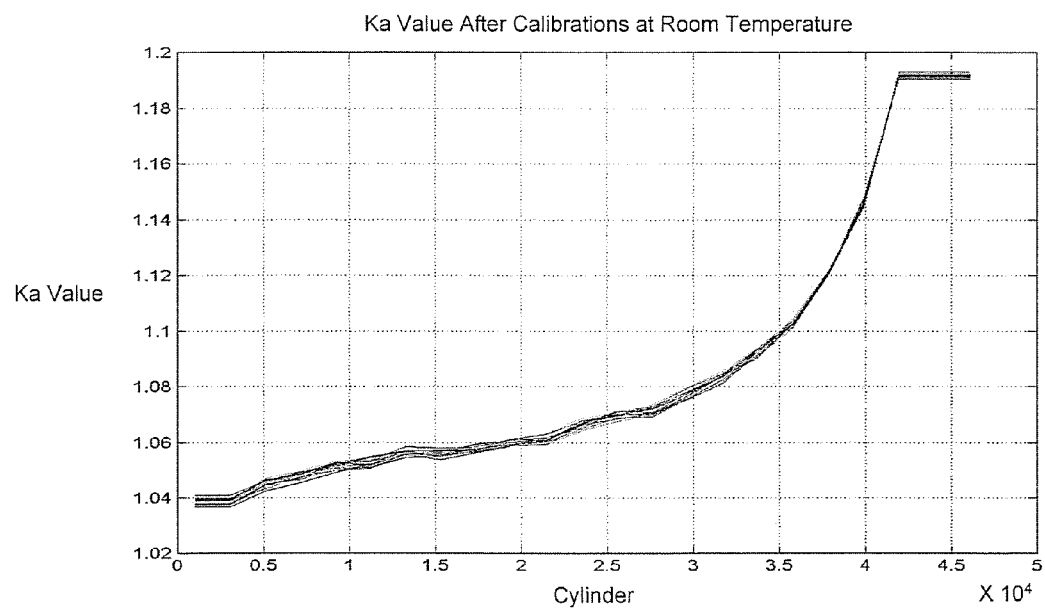
FIG. 8 illustrates a graph of the variation in servo gain Ka relative to radial zones across the disk as may be exhibited by some embodiments.

FIG. 8 illustrates a graph of exemplary variation in calibrated servo gain Ka that may be obtained relative to radial zones across the disk 12 and at room temperature after 15 iterative cycles of the servo gain Ka calibration operations described therein in accordance with some embodiments.

Figure 9:
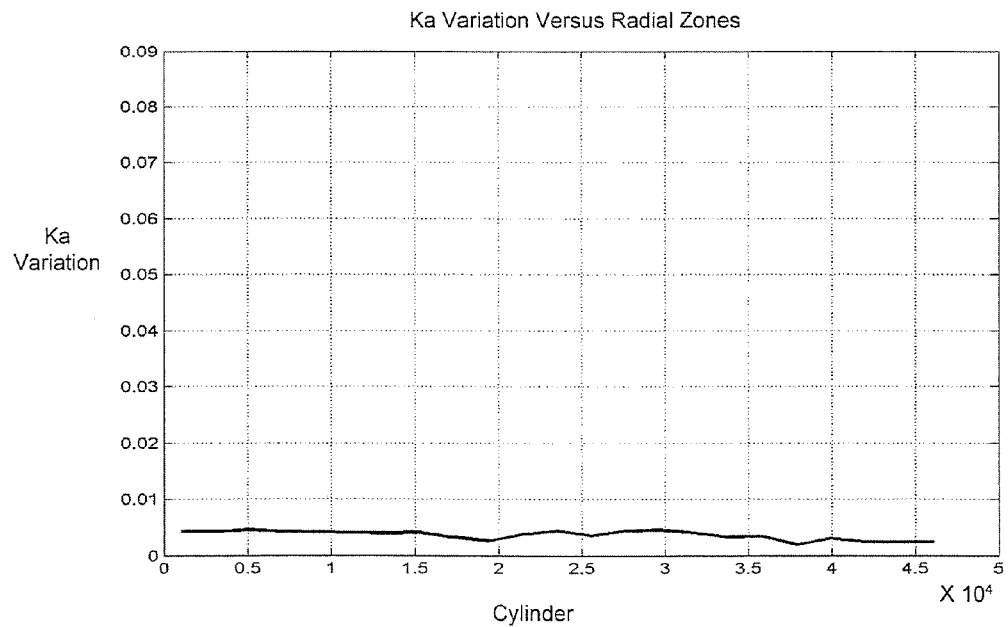
FIG. 9 illustrates a graph of the variation in servo gain Ka relative to radial zones across the disk as may be exhibited by some embodiments.

FIG. 9 illustrates a graph of exemplary variation in servo gain Ka in response to calibration across a range of disk track cylinders, as may be exhibited by some embodiments.

Figure 10:
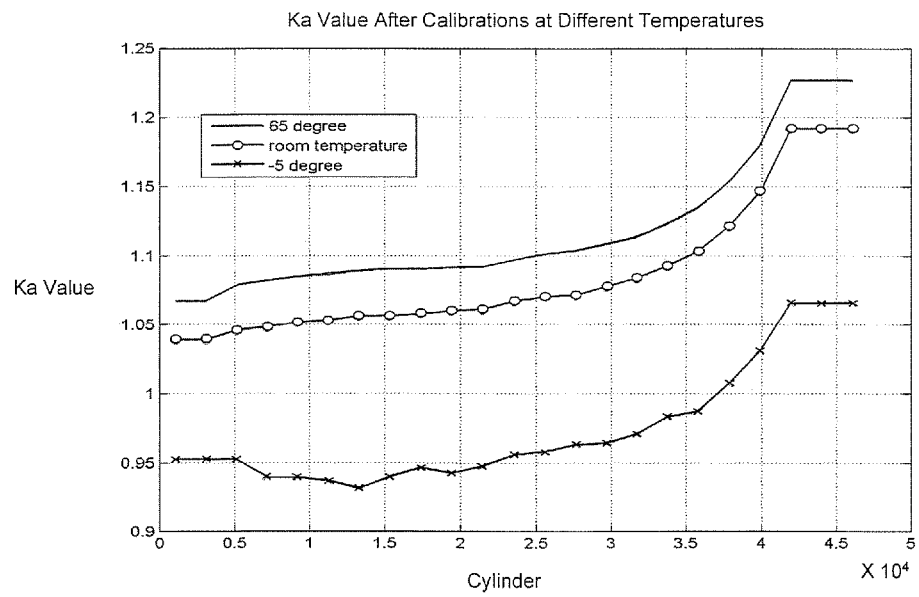
FIG. 10 illustrates graphs of variation in servo gain Ka in response to calibration across a range of disk track cylinders at various temperatures as may be exhibited by some embodiments.

The torque constant of the servo motor 28 can vary in response to temperature. To compensate for variation in the motor torque constant, the servo controller 53 may calibration the servo gain Ka across a range of temperatures, and may generate/update a table of servo gain Ka values that are associated with, for example, defined ranges of temperatures and radial zones on the disk 12. Accordingly, the servo controller 53 may then select among the servo gain Ka values in response to temperature measured in the disk drive 10 and radial location of the head 20 and a target track on the disk 12. FIG. 10 illustrates graphs of exemplary values of calibrated servo gain Ka across a range of disk track cylinders and at various temperatures, as may be exhibited by some embodiments.

Figure 11:
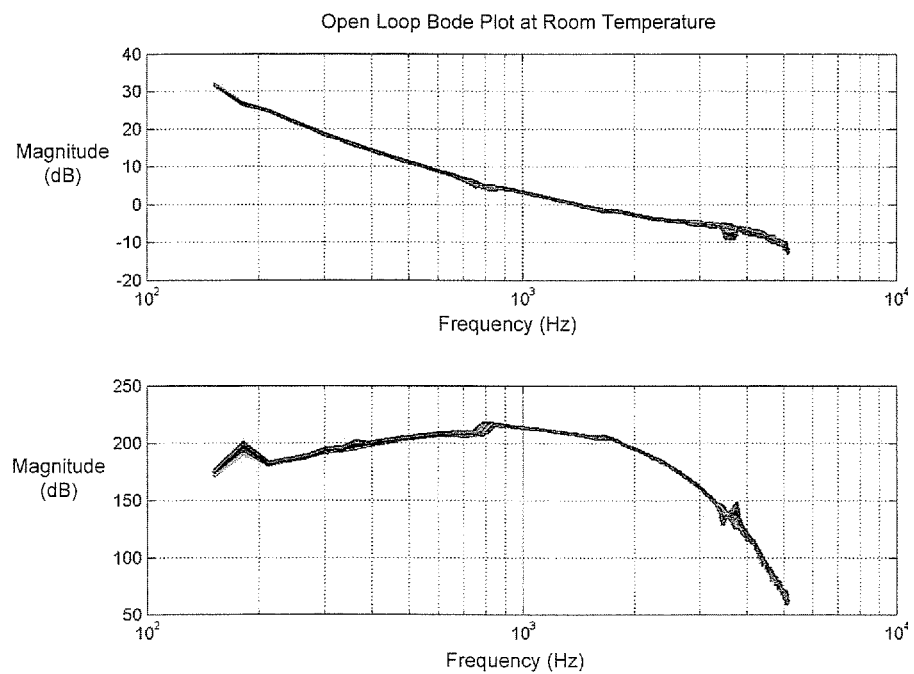
FIG. 11 illustrates graphs of open loop bode plots at room temperature relative to radial zones across the disk as may be provided by a servo gain Ka which is calibrated in accordance with some embodiments of the present invention.

FIG. 11 illustrates graphs of open loop bode plots at room temperature relative to radial zones across the disk as may be provided by a servo gain Ka which is calibrated in accordance with some embodiments of the present invention. It is noted in FIG. 11 the calibrated gain Ka values may exhibit nearly the same gain cross-over frequency for a plurality of radial zones across the disk 12, with a variation which may be less than about 100 Hz.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. An apparatus comprising:
a circuit that determines a bias force error between an estimated bias force and an actual bias force on an actuator during movement by a servo motor, adjusts a servo gain in response to differences between an accumulated bias force error and an accumulated position error between present and desired actuator locations as the circuit repetitively positions the actuator, and regulates movement of the actuator by the servo motor in response to the servo gain.

2. The apparatus of claim 1, wherein the circuit applies the servo gain to a servo command to generate a servo current supplied to the servo motor.

3. The apparatus of claim 1, wherein the circuit iteratively adjusts the servo gain by accumulating position error and accumulating bias force error in response to measurements carried out while the actuator is repetitively repositioned for each iteration, by determining a gain adjustment value in response to a difference between the accumulated position error and the accumulated bias force error after repositioning of the actuator for each iteration, and by determining a new servo gain for a present iteration in response to the gain adjustment value combined with a previous servo gain from a previous iteration.

4. The apparatus of claim 3, wherein the circuit scales the gain adjustment value by a convergence constant to generate a scaled gain adjustment value, and adds the scaled gain adjustment value to the previous servo gain to determine the new servo gain.

5. The apparatus of claim 3, wherein the circuit ceases iterative adjustment of the servo gain in response to a difference between the new servo gain and the previous servo gain being less than a threshold gain convergence value.

6. An apparatus comprising:
a circuit that determines a bias force error between an estimated bias force and an actual bias force on an actuator during movement by a servo motor, uses the bias force error to adjust a first servo gain value in a table in response to the actuator being moved in a seek operation in a first seek direction, uses the bias force error to adjust a second servo gain value in the table in response to the actuator being moved in a seek operation in a second seek direction which is opposite to the first seek direction, applies the first servo gain value from the table to a servo command to generate a servo current to seek the actuator in the first seek direction, and applies the second servo gain value from the table to a servo command to generate a servo current to seek the actuator in the second seek direction, wherein the first and second servo gain values reside at different variable locations in the table.

7. An apparatus comprising:
a circuit that performs a plurality of seek operations that seek an actuator to a plurality of different radial locations on a disk and for each of the seek operations the circuit adjusts a different one of a plurality of servo gain values residing at different variable locations in a table, and the circuit selects a servo gain value from among the table of servo gain values in response to a radial location of a defined seek operation and uses the selected servo gain value to control the servo motor during the defined seek operation.

8. The apparatus of claim 7, wherein the circuit selects a first one of the servo gains from the table in response to a seek operation identifying a first target radial location on the disk and uses the first servo gain to regulate servo motor movement of the actuator toward the first target radial location, and the circuit selects a different second one of the servo gains from the table in response to another seek operation identifying a different second target radial location on the disk and uses the second gain to regulate servo motor movement of the actuator toward the second target radial location.

9. An apparatus comprising:
a circuit that determines a bias force error based on an accumulation of differences between estimated responses and measured responses of a servo motor to servo current while an actuator is moved during a seek operation to a target location, adjusts a servo gain in response to the bias force error, and regulates movement of the actuator by the servo motor in response to the servo gain.

10. The apparatus of claim 9, wherein the circuit determines the bias force error based on integration of the differences between the estimated responses and the measured responses of the servo motor over a period of time that substantially corresponds to elapsed time while the actuator is moving during the seek operation to the target location.

11. The apparatus of claim 9, wherein the circuit adjusts the servo gain based on differences between: 1) a position error, which is determined based on double integration of differences between a measured actuator location and a desired actuator location during the seek operation; and 2) the bias force error, which is determined based on single integration of estimated responses and the measured responses of the servo motor during the seek operation.

12. A method comprising:
determining a bias force error based on an accumulation of differences between estimated responses and measured responses of a servo motor to servo current while an actuator is moved during a seek operation to a target location;
adjusting a servo gain in response to the bias force error; and
regulating movement of the actuator by the servo motor in response to the servo gain.

13. The method of claim 12, wherein the servo gain is adjusted in response to a difference between the bias force error and a position error between a present location of the actuator and a desired location of the actuator.

14. The method of claim 12, wherein the bias force error is determined based on integration of differences between estimated responses and measured responses of the servo motor over a period of time that substantially corresponds to elapsed time while the actuator is moving during a seek operation to a target location.

15. The method of claim 12, wherein the servo gain is adjusted based on differences between: 1) a position error, which is determined based on double integration of differences between a measured actuator location and a desired actuator location during a seek operation; and 2) the bias force error, which is determined based on single integration of estimated responses and measured responses of the servo motor during the seek operation.

* * * * *